United States Patent
Harding

(10) Patent No.: US 10,844,732 B2
(45) Date of Patent: Nov. 24, 2020

(54) AEROFOIL AND METHOD OF MANUFACTURE

(71) Applicant: ROLLS-ROYCE plc, London (GB)

(72) Inventor: Adrian L. Harding, Derby (GB)

(73) Assignee: Rolls-Royce plc, London ( * ) Notice: Subject to any disclaimer, the term of this patent is extended or adjusted under 35 U.S.C. 154(b) by 195 days.

(21) Appl. No.: 16/191,668

(22) Filed: Nov. 15, 2018

(65) Prior Publication Data

US 2019/0186275 A1 Jun. 20, 2019

(30) Foreign Application Priority Data

Dec. 14, 2017 (GB) .................. 1720829.9

(51) Int. Cl.

| F01D 5/18 | (2006.01) |
|---|---|
| B22C 13/10 | (2006.01) |
| B23P 15/04 | (2006.01) |
| B22C 9/24 | (2006.01) |
| F01D 5/14 | (2006.01) |
| B22C 9/22 | (2006.01) |

(Continued)

(52) U.S. Cl.
CPC .............. F01D 5/187 (2013.01); B22C 9/10 (2013.01); B22C 9/22 (2013.01); B22C 9/24 (2013.01); B22C 13/10 (2013.01); B22D 25/02 (2013.01); B23K 1/0018 (2013.01); B23P 15/04 (2013.01); F01D 5/147 (2013.01); F01D 9/041 (2013.01); B23K 2101/001 (2018.08); F05D 2230/21 (2013.01); F05D 2230/211 (2013.01); F05D 2230/232 (2013.01); F05D 2230/237 (2013.01); F05D 2240/301 (2013.01); F05D 2260/20 (2013.01); F05D 2260/204 (2013.01)

(58) Field of Classification Search
CPC .......... F01D 5/187; F01D 5/147; B23P 15/04; B22C 9/22; B23K 1/0018
See application file for complete search history.

(56) References Cited

U.S. PATENT DOCUMENTS

| 4,089,456 A | 5/1978 | Toppen et al. |
| 5,152,059 A | 10/1992 | Midgley |

(Continued)

FOREIGN PATENT DOCUMENTS

| CN | 103046967 A | 4/2013 |
| EP | 0090887 | 10/1983 |

(Continued)

OTHER PUBLICATIONS

Great Britain Search Report dated Jun. 8, 2018, issued in GB Patent Application No. 1720828.1.

(Continued)

*Primary Examiner* — Eldon T Brockman
(74) *Attorney, Agent, or Firm* — Barnes & Thornburg LLP

(57) ABSTRACT

A method of manufacturing the aerofoil, and an aerofoil. The method includes: casting a first body portion having a passage passing there-through; casting a second body portion; and joining the first body portion and the second body portion to form the aerofoil. The passage extends from an opening at a first end at or near a leading edge to an opening at a second end at or near a trailing edge. The passage is formed during the casting process by a core; and the core is supported at the first and second ends through the respective openings of the passage.

16 Claims, 5 Drawing Sheets

(51) Int. Cl.
*B22C 9/10* (2006.01)
*B22D 25/02* (2006.01)
*B23K 1/00* (2006.01)
*F01D 9/04* (2006.01)
*B23K 101/00* (2006.01)

(56) References Cited

U.S. PATENT DOCUMENTS

| | | | | |
|---|---|---|---|---|
| 5,176,499 | A | * | 1/1993 | Damlis ............ B23P 15/04 |
| | | | | 29/888.024 |
| 5,246,340 | A | | 9/1993 | Winstanley et al. |
| 5,419,039 | A | | 5/1995 | Auxiet et al. |
| 8,562,295 | B1 | | 10/2013 | Liang |
| 10,329,918 | B2 | * | 6/2019 | Slavens ............ F01D 5/147 |
| 2010/0129217 | A1 | * | 5/2010 | Cherolis ........... F01D 5/147 |
| | | | | 416/91 |
| 2011/0135497 | A1 | | 6/2011 | Marmilic et al. |
| 2015/0159488 | A1 | | 6/2015 | Lehmann et al. |
| 2016/0215627 | A1 | | 7/2016 | Roberge et al. |
| 2016/0265362 | A1 | * | 9/2016 | Slavens ............ B23K 1/0018 |

FOREIGN PATENT DOCUMENTS

| | | |
|---|---|---|
| EP | 0520714 | 12/1992 |
| EP | 1216785 | 6/2002 |
| EP | 1760264 A2 | 3/2007 |
| GB | 2518335 | 3/2015 |
| JP | 2000248901 A | 9/2000 |
| WO | 2015058043 | 4/2015 |

OTHER PUBLICATIONS

Great Britain Search Report dated Jun. 12, 2018, issued in GB Patent Application No. 1720829.9.
Extended European Search Report, European Application No. 18206187.9-1006, dated Apr. 18, 2019, 24 pages.

* cited by examiner

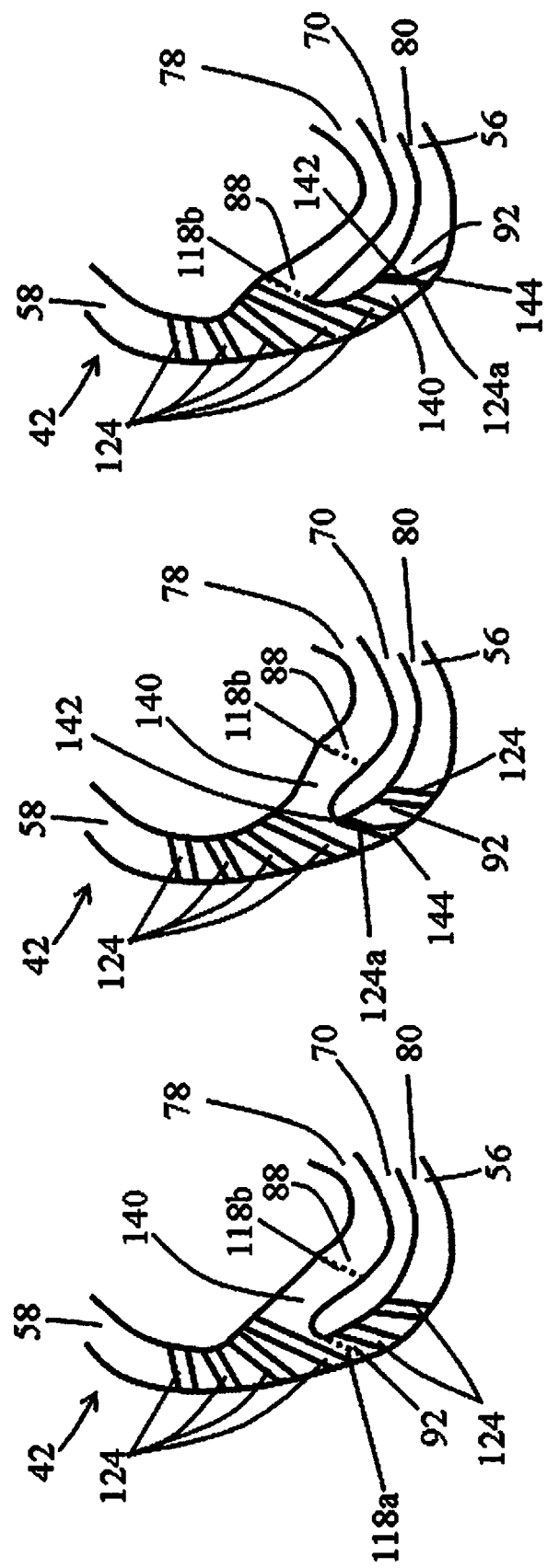

AEROFOIL AND METHOD OF MANUFACTURE

CROSS-REFERENCE TO RELATED APPLICATIONS

This specification is based upon and claims the benefit of priority from UK Patent Application Number GB 1720829.9 filed on Dec. 14, 2017, the entire contents of which are incorporated herein by reference.

BACKGROUND

Technical Field

The present disclosure concerns a method for manufacturing an aerofoil for a gas turbine engine, and an aerofoil for use in a gas turbine engine. In particular, but not exclusively, the aerofoil may be a vane.

Description of the Related Art

Gas turbine engines include a number of rotating fan components, including the propulsive fan, compressor stages and turbine stages. The blades of the rotating fan components are formed by aerofoils. The gas turbine engine also includes a number of vanes. The vanes are provided before the rotating fan components, to direct the fluid (such as air) flowing through the engine and are also formed of aerofoils. The vanes, especially but not only those provided in the turbine stages, are required to withstand high temperatures, and so require cooling. Typically, cooled vanes included a narrow cooling passage adjacent at least an upstream surface of the vane.

In one example, the vane is formed by a cast spar. The cooling passage is formed by bonding a thin skin to the spar, with the passage formed between the skin and the spar. For high-temperature environments, the skin is typically machined from a cast single crystal sheet, and made from materials able to withstand high temperatures.

In another example, the vane is formed by a casting process, using a core to produce an internal passage in the vane. The casting process uses a mould defining a chamber in which the vane is formed. The core passes through the chamber, and thus also passes through the vane as it is formed. The core may be supported from its edges, during the casting process. Once the core is removed, the body of the vane may include unwanted openings into the internal passage, where the core was supported. These may be plugged, which may leave artefacts or weak points in the cast part.

SUMMARY

According to a first aspect there is provided a method of manufacturing an aerofoil having a pair of opposing axial faces extending between a leading edge and a trailing edge, the method including: casting a first body portion forming at least part of the first axial face of the aerofoil, the first body portion having a passage passing there-through, wherein the passage extends from an opening at a first end at or near the leading edge to an opening at a second end at or near the trailing edge; wherein the passage is formed during the casting process by a core; and wherein the core is supported at the first and second end through the respective openings of the passage, during casting, removing the core from the first body portion; casting a second body portion forming at least part of the second axial face; and joining the first body portion and the second body portion to form the aerofoil, wherein the second body portion closes at least the opening at the first end of the passage.

The method simplifies the support of the core used in casting the first body portion, by using openings required in the assembled aerofoils, or openings that can be closed by the second body portion. This improves the efficiency of casting the aerofoil. Since the aerofoil comprises only two parts, the aerofoil is thus quick and simple to make.

The second body portion may not fully close the opening at the second end of the passage. The first and second body portions may co-operate at the second end of the passage to form a slot extending from the passage to the exterior of the aerofoil. The slot may be defined by a first sidewall formed by the first body portion and a second sidewall, opposing the first sidewall, formed by the second body portion.

Forming the slot between the two body portions allows for the slot to be made thinner, improving the efficiency of the aerofoil. Also, the thickness of the sidewalls, and the position of the slot relative to the external surfaces, can be better controlled to improve aerodynamic efficiency. Furthermore, because the slot is formed between the two body portions, the thickness of the core at the trailing edge can be increased, when casting the first body portion, improving the casting process.

The method may include machining either or both of a region of the first body portion and a region of the second body portion forming the sidewalls of slot. Machining the regions forming the sidewalls of the slot enables the size of the slot to be better controlled, and more consistent along its length.

The passage may be formed between an external wall arranged to form an external surface of the aerofoil, and an internal wall opposing the external wall, and arranged to face an interior of the completed aerofoil.

In the first body portion, the external wall may extend beyond the internal wall at the trailing edge. The core may extend out of the opening at the second end, along the external wall. The core may be enlarged in a region outside the opening at the second end, such that the enlarged region of the core is larger than the passage. Using an enlarged core outside the passage provides for improved flow of the core material, during manufacture of the core and improved support of the core, during casting.

Joining the first body portion and the second body portion to form the aerofoil may include: bonding an end of the internal wall formed by the first body portion to the second body portion. An end of the external wall formed by the first body portion may be spaced from the second body portion, such that a through-hole extending from the cooling passage to the exterior of the aerofoil is formed at or near the leading edge. This enables through-holes to be formed between the cooling passage and the exterior of the aerofoil, at the leading edge, in a simple and efficient manner.

At least one of the internal wall and external wall may be formed wholly in the first body portion. This makes the casting of the second body portion simple, as no core is required.

The first body portion may include through-holes extending through the internal wall, into the passage. The core may be further supported at the through-holes, during casting. This provides for further support of the core, using existing features in the part being cast.

The method may include: removing a portion of the material of the first body portion in either or both of the region of the first end and the second end of the passage.

This ensures that the ends of the body portion are clean and smooth, to bond to the second body portion.

A conduit may be formed between the first body portion and the second body portion. The conduit may be separated from the passage by a part of the first body portion. This enables a cooled aerofoil to be formed in a simple manner, by using the core discussed above to form the cooling passage, and then using the co-operation of the body parts to form the conduit that supplies cooling fluid into the cooling passage.

The step of casting the second body portion may include casting the second body portion without using a core.

According to a second aspect of the disclosure, there is provided an aerofoil formed by the method of the first aspect.

As discussed above, the aerofoil is simple and easy to make, using a casting process.

According to a third aspect of the disclosure, there is provided an aerofoil having: a pair of opposing axial faces extending between a leading edge and a trailing edge, and a length extending parallel to the leading edge and trailing edge; a conduit formed extending along the length of the aerofoil; and a passage extending adjacent to a first of the pair of axial faces, from a first end at the leading edge to a second end at the trailing edge, wherein the aerofoil comprises a first body portion, and a second body portion formed separately from and bonded to the first body portion; wherein the conduit is formed between the first body portion and the second body portion; and wherein the passage extends within the first body portion, and at least a first end of the passage is closed by the second body portion.

The aerofoil is simple and efficient to make, because the structure simplifies the support of the core used in casting the first body portion, by using openings required in the assembled vanes, or openings that can be closed by the second body portion.

The aerofoil may include: a slot formed at the trailing edge, the slot extending from the second end of the passage, to an exterior of the aerofoil. The slot may be defined by a first sidewall formed by the first body portion and a second sidewall, opposing the first sidewall, formed by the second body portion, such that the slot is formed by the first body portion and the second body portion in co-operation.

Forming the slot between the two body portions allows for the slot to be made thinner, improving the efficiency of the aerofoil. Also, the thickness of the sidewalls, and the position of the slot relative to the external surfaces, can be better controlled to improve aerodynamic efficiency. Furthermore, because the slot is formed between the two body portions, the thickness of the core at the trailing edge can be increased during casting of the first body portion, improving the casting process.

The first body portion may comprise an external wall arranged to form an external surface of the aerofoil, and an internal wall opposing the external wall, and arranged to face an interior of the completed aerofoil. The passage may be defined between the internal wall and the external wall.

The external wall of the first body portion may extend beyond the internal wall at the second end of the passage. The aerofoil may include: a bonded joint between the internal wall of the first body portion, and the second body portion; and a through-hole extending from the cooling passage to the exterior of the aerofoil is formed, a first side of the through-hole formed by the external wall of the first body portion, and a second side of the through-hole, opposing the first side, formed by the second body portion.

This enables through-holes to be formed between the cooling passage and the exterior of the aerofoil, at the leading edge, in a simple and efficient manner.

In any of the above aspects, the body of the aerofoil may consist of only the first and second body portions.

According to a fourth aspect of the disclosure, there is provided a component of a gas turbine engine including one or more aerofoils according to the second or third aspect. The component may be a stator in a turbine or compressor stage of the engine.

Since, as discussed above, the aerofoil is simple and easy to make, this also makes the component simple and easy to make.

According to a fifth aspect of the disclosure, there is provided a gas turbine engine comprising the component of the fourth aspect.

According to a sixth aspect of the disclosure, there is provided a mould arranged to carry out the method of the first aspect, the mould including a core for forming the passage in the first body portion, the mould arranged to be supported through the openings at the first and second end of the passage.

The skilled person will appreciate that except where mutually exclusive, a feature described in relation to any one of the above aspects may be applied mutatis mutandis to any other aspect. Furthermore except where mutually exclusive any feature described herein may be either or both of applied to any aspect and combined with any other feature described herein.

DESCRIPTION OF THE DRAWINGS

Embodiments will now be described by way of example only, with reference to the Figures, in which:

FIG. 7A shows the leading edge of the vane of FIG. 3 in more detail, illustrating an alternative embodiment;

FIG. 7B shows the leading edge of the vane of FIG. 3 in more detail, illustrating a further alternative embodiment; and FIG. 7C shows the leading edge of the vane of FIG. 3 in more detail, illustrating a yet further alternative embodiment.

DETAILED DESCRIPTION

Figure 1:
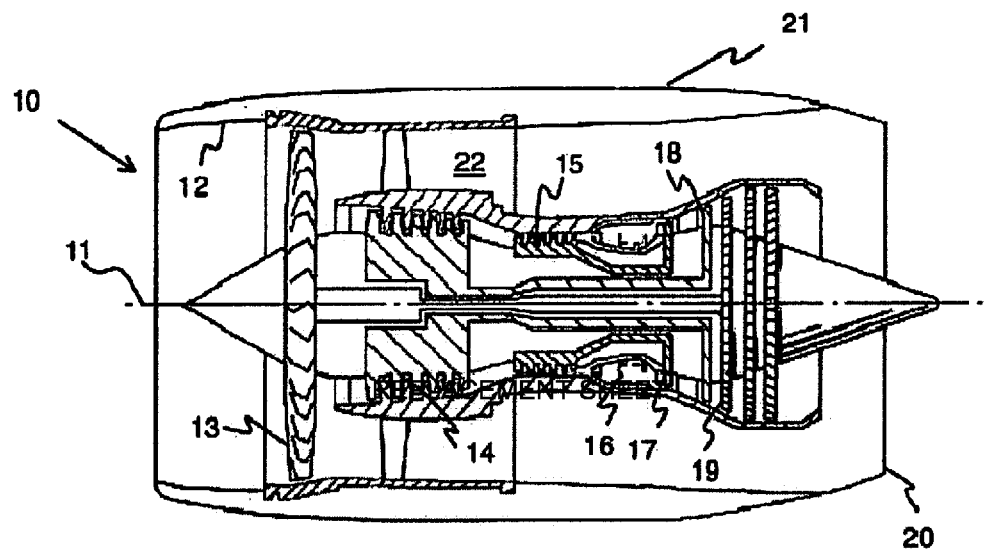
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have either or both of an alternative number of interconnecting shafts (e.g. two) and an alternative number of either or both of compressors and turbines. Further the engine may comprise a gearbox provided in the drive train from a turbine to either or both of a compressor and a fan.

Figure 2:
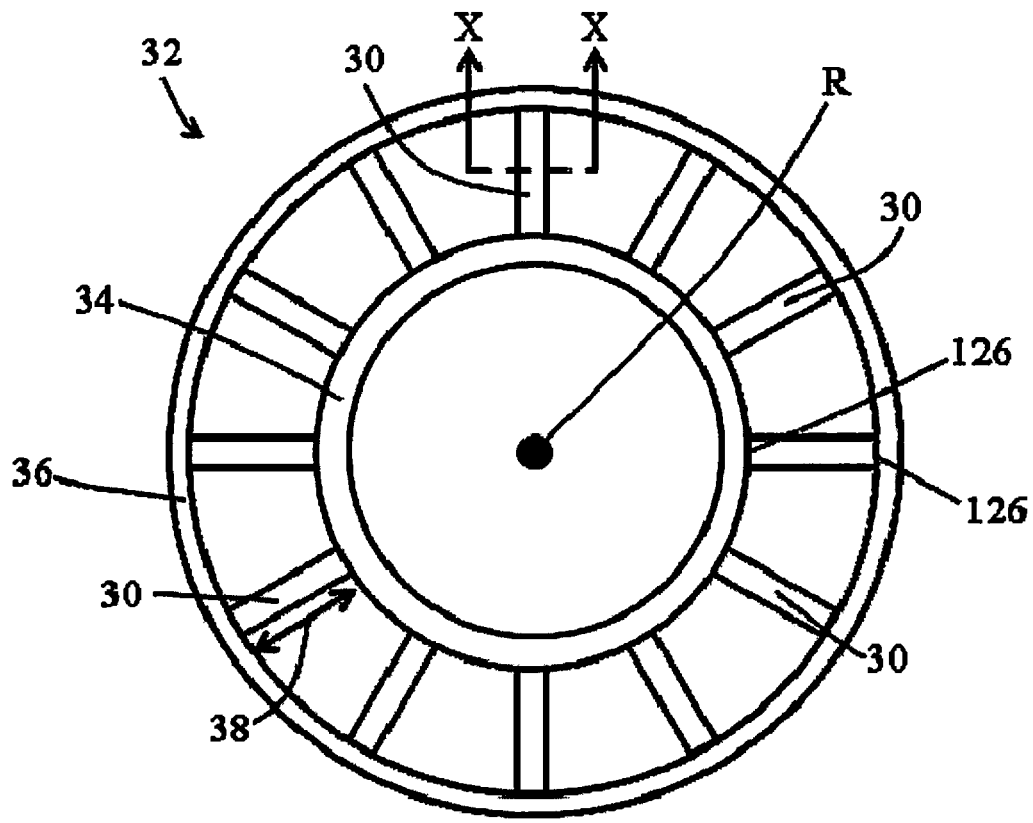
FIG. 2 is a front on view of a component of a gas turbine engine for mounting vanes.

The propulsive fan 13, compressor stages 14, 15 and the turbine stages 17, 18, 19 include rotating fan components, arranged around the rotational axis 11. To ensure efficient and even flow through the engine 10, a number of vanes 30 are also provided, between the rotating components 13, 14, 15, 17, 18, 19. FIG. 2 schematically illustrates a front view of a component 32 (also known as a stator) of a gas turbine engine 11 for supporting a number of vanes 30 in an annular space around the rotation axis 11.

The stator 32 includes an inner platform 34 and an outer platform 36 arranged around an axis of rotation R. This axis R may coincide with the rotation axis 11 of the gas turbine engine 10, or may be parallel but offset The inner and outer platforms 34, 36 are annular in shape, and arranged concentrically. A number of vanes 30 extend between the inner platform 34 and the outer platform 36, in a radial direction with respect to the axis of rotation R. The radial height 38 of the vanes extends from the inner platform 34 to the outer platform 36. The platforms 34, 36 and vanes 30 have an axial length extending along the axis of rotation R, from an upstream end, towards a downstream end.

Figure 3:
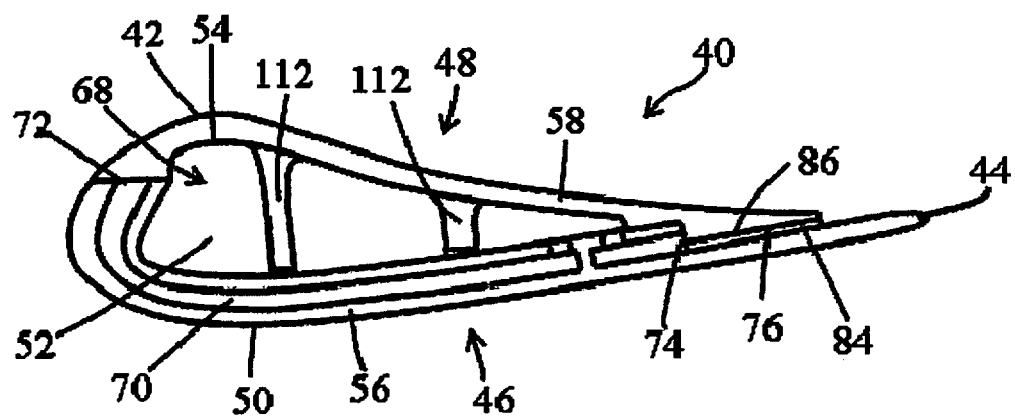
FIG. 3 is sectional view of an aerofoil taken through a vane, through line X-X in FIG. 2.

FIG. 3 shows a cross section through one of the vanes 30, taken through line X-X in FIG. 2. The cross section is taken along the axial length of the vane 30, and perpendicular to the radial height 38 of the vane 30.

Each vane 30 is made up of a body 40 having an aerofoil shape, in cross section. Accordingly, the body 40 has two axial faces 46, 48 extending between a leading edge 42 and a trailing edge 44, the two axial faces 46, 48 being connected by a curved surface in the region of the leading edge 42. Away from the leading edge 42 and trailing edge 44, the axial faces 46, 48 are spaced apart from each other. The leading edge 42 is arranged to face towards the up-stream end of the stator 32, in use. A first axial face 48 extends between the leading edge 42 and trailing edge 44 on the front of the body 40 and a second axial face 46 similarly extends between the leading edge 42 and trailing edge 44 on the rear of the body 40.

A suction surface and pressure surface are defined by the length of the surfaces along the rear face 46 and front face 48 from the leading edge 42 to the trailing edge 44. The suction surface is the surface with the longer length, and the pressure surface the surface with the shorter length.

A conduit 52 is formed within the body 40, between the front face 48 and rear face 46. The conduit 52 is defined by the inner surface 54 of the body 40, and extends along the radial height 38 of the vane 30, from the inner platform 34 to the outer platform 36, and also along the axial length of the vane 30, from the leading edge 42 to the trailing edge 44.

A separate cooling passage 70 is also formed within the body 40, adjacent to the rear face 46 of the body 40, and, around at least a portion of the circumference of the conduit 52. Similarly to the conduit 52, the cooling passage 70 extends along the radial height 38 of the vane 30, from the inner platform 34 to the outer platform 36. In the axial direction, the cooling passage 70 extends from a first end 72, at or near the leading edge 42 to a second end 74 at or near the trailing edge 44.

The cooling passage 70 is formed within the body 40 of the vane 30. The cooling passage splits the body 40 into two parts along the axial and radial length of the passage 70—an internal wall 78 between the cooling passage 70 and the conduit 52, defined on the interior of the vane 30, and an external wall 80 between the cooling passage 70 and the exterior of the vane 30. The cooling passage 70, internal wall 78 and external wall 80 are of constant thickness along the axial and radial length of the passage 70. In the region where there is no passage 70, the body 40 is formed by a single wall 82.

The first end 72 of the passage 70 is closed by the body 40 of the vane 30. At the first end 72, the body 40 is formed by a single wall 82 that blocks the first end 72 of the passage 70.

The second end 74 of the passage 70 is partially closed by the body 40, near the trailing edge 44. At the second end 74, the passage 70 has a narrow opening into a trailing edge slot 76, formed between the rear face 46 and front face 48. The slot is formed by a first sidewall 84 formed by the rear face 46 and a second sidewall 86 formed by the front face 48.

The slot 76 provides an opening between the cooling passage 70 and the exterior of the vane 30. The slot 76 may extend the full radial height of the body 40, or a portion of the radial height. The slot 76 may include spacers or supports (not shown) extending between the rear face 46 and front face 48, positioned along its radial height, forming partial closures. Alternatively, the slot 92 may be fully open along its radial height.

The body 40 is constructed of two separately formed portions 56, 58. In the example shown, a first portion 56 forms the trailing edge 44, and the majority of the rear face 46. The second portion 58 forms the remainder rear face 46, the leading edge 42, and the front face 48 to the trailing edge 44.

Figure 4A:
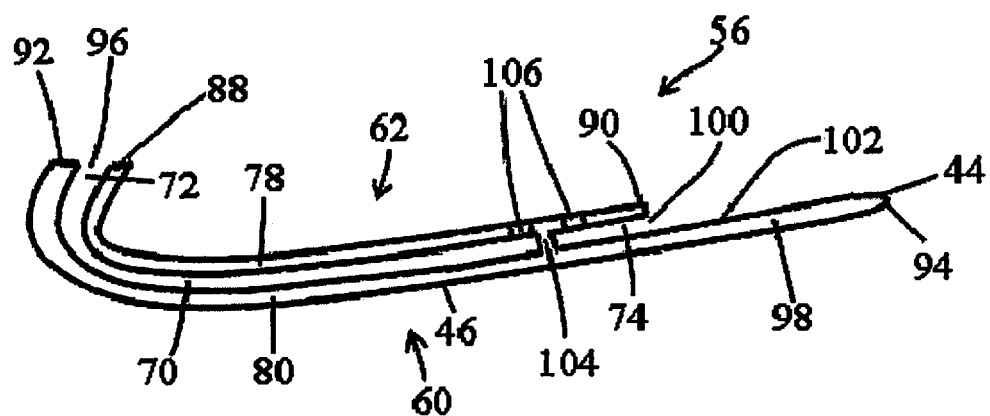
FIG. 4A is a sectional side view of a first body portion of the aerofoil of FIG. 3.
Figure 4B:
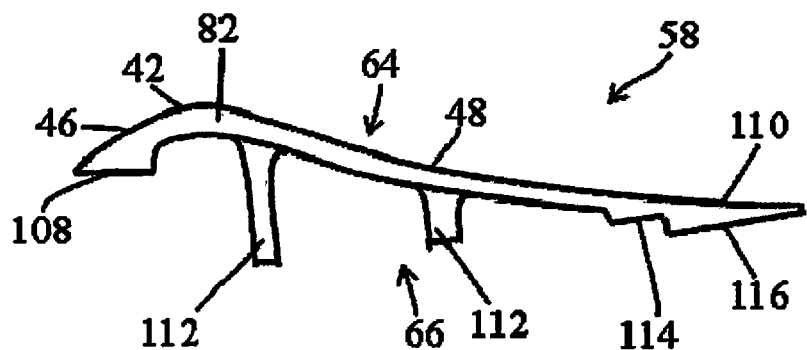
FIG. 4B is a sectional side view of a second body portion of the aerofoil of FIG. 3.

FIG. 4A shows the first portion 56 of the body 40. The first portion 56 of the body 40 includes the internal wall 78 and the external wall 80. As discussed above, the passage 70 is defined between then internal wall 78 and external wall 80.

The internal wall 78 extends from a first wall end 88 at the first end 72 of the passage 70 (at or near the leading edge 42), to a second wall end 90, at the second end 74 of the passage 70 (at or near the trailing edge). Similarly, the external wall 80 extends from a first wall end 92 at the first end 72 of the passage 70 to a second wall end 94 at the second end 74 of the passage 70.

The first wall end 92 of the external wall 80 aligns with the first wall end 88 of the internal wall 78, to define a first opening 96 into the passage 70 at the first end 72 of the passage 70. However, at the second end 74 of the passage 70, the external wall 80 has an extended region 98 extending beyond the internal wall 78. Therefore, the external wall 80 projects beyond the second end 90 of the internal wall 78. A second opening 100 to the passage 70 is defined at the second end 74 by the end 90 of the internal wall 78 and the internal face 102 of the external wall 80.

The first body portion 56 has an outer face 60 forming a portion of the exterior surface 50 of the vane 30, and an inner face 62 facing into the centre of the vane 30. The outer face 60 is formed by the external wall 80 along the length of the first portion 56. A part of the inner face 62 is formed by the internal wall 78. However, where the external wall 80 projects beyond the second end 90 of the internal wall 78, the extended region 98 of the external wall forms a second part of the inner face 62 of the first body portion 56.

As shown in FIG. 4A, the first body portion 56 includes a cross brace 104 extending across the passage 70, between the internal wall 78 and the external wall 80. In some examples, the cross brace 104 may extend the full radial height of the vane 30, to divide the passage 70 into two parts along its axial length. In other examples, the cross brace 104 may only extend a part of the radial height. In this case multiple cross braces 104 may be provided at different positions along the radial height, defining gaps there-between.

Through-holes 106 may be defined extending through the internal wall 78, into the passage 70. In some examples, through-holes may be arranged either side of the cross brace 104, in the direction of the axial length.

The second body portion 58 is formed by the single wall 82, extending between a first end 108 near the leading edge 42 and a second end 110 near the trailing edge 44. The second body portion 58 also has an outer face 64 forming a portion of the exterior surface 50 of the vane 30 and an inner face 66 facing into the vane 30.

A pair of struts 112 extend from the inner face 64 of the second body portion 58, midway between the first end 108 and the second end 110. Furthermore, a pair of steps 114, 116 are formed in the inner face 64 at the second end 110. The struts 112, and steps 114, 116 will be discussed in more detail below.

Figure 4C:
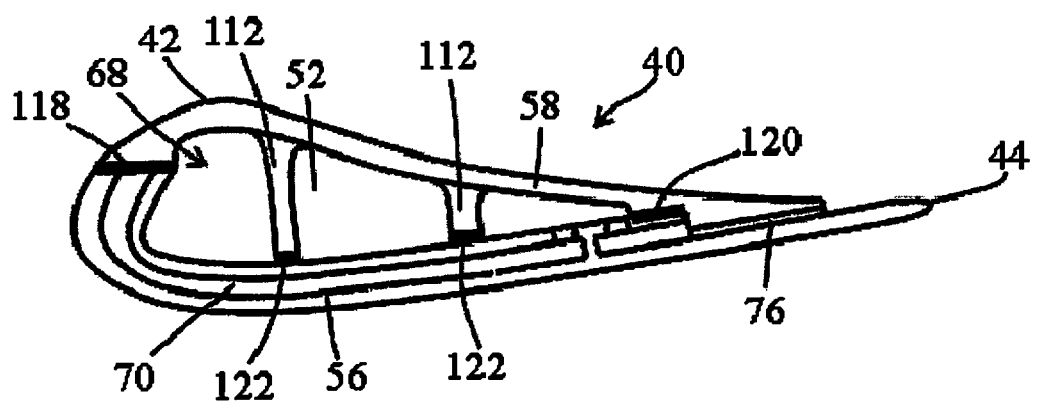
FIG. 4C is a sectional side view of the aerofoil of FIG. 3, illustrating the bonding between the body portions in more detail.
Figure 4D:
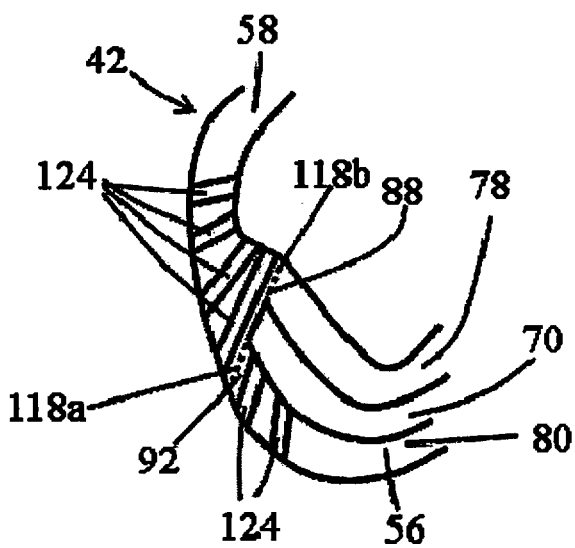
FIG. 4D shows the leading edge of the vane of FIG. 3 in more detail.

FIGS. 4C and 4D illustrate the joins between the first body portion 56 and the second body portion 58 in more detail. FIG. 4D shows the joint near the leading edge 42, in particular. Near the leading edge, through-holes 124 are formed in the external wall 80 between the passage 70 and an exterior of the vane 30. Further through-holes 124 are provided through the single wall 82 between the conduit 52 and the exterior of the vane 30. These are only shown in FIG. 4D, for clarity.

The body portions 56, 58 are joined so that the first end 108 of the single wall 82 rests on the first ends 88, 92 of the internal wall 78 and external wall 80. This closes the opening 96 at the first end of the passage 70. A leading edge bond line 118 is formed, where the single wall 82 is brazed to the internal and external walls 78, 80 of the first body portion 56.

At the second end 110 of the single wall 82, the first step 114, the step furthest from the end 110 of the wall 82, forms a surface that contacts and extends along a portion of the internal wall 78 of the first body portion 56, at the second end 90 of the internal wall 78. A trailing edge bond line 120 is formed at this point, where the body portions 56, 58 are again brazed.

The struts 112 extend across the gap from the inner face 66 of the second body portion 58 to the inner face 62 of the first body portion 56 to the internal wall 78. Strut bonding lines 122 are formed here, where the ends of the struts 112 are brazed to the internal wall 78.

At the second end 110 of the single wall 82, the second step 116, at the end 110 of the wall 82, extends downwards, past the second end 94 of the internal wall 78, to partially, but not fully, close the second opening 100 in the passage 70. The second step 116 then extends parallel to the extended portion 98 of the external wall 80.

The external wall 80 of the first body portion 56 extends beyond the second step 116 in the second body portion 58, so the trailing edge of the vane 30 is formed by the first body portion 56.

The conduit 52 in the vane 30 is formed by bringing the body portions 56, 58 together. The conduit 52 is defined by the part of the inner face 62 of the first body portion formed by the internal wall 78, and the inner face 66 of the second body portion 58. The struts 112 extend across the conduit.

The slot 76 at the trailing edge of the passage 70 is formed between the extended portion 98 of the external wall of the first body portion 56, and the second step 116 at the second end 110 of the second body portion 58. The first sidewall 84 of the slot 76 is formed by the internal face 102 of the external wall 80 in the extended portion 98. The second sidewall 86 of the slot 76 is formed by the step 116

In the assembled stator 32, each vane 30 is fixed to the platforms 34, 36 using bi-cast joints 126. As well as securing the vanes 30 to the platforms 34, 36, the bi-cast joints 126 further act to hold the body portions 56, 58 together, and can help maintain the structural integrity of the vane 30, even in the event of failure of one or more of the brazing joints 118, 120, 122.

The body portions 56, 58 of the vane 30 are formed of material that is resistant to high temperature oxidation and fatigue and melting, so that the outer surface 50 of the vane 30 is able to withstand the harsh environments the vane 30 may experience in, for example, a turbine stage 17, 18, 19 of a turbine engine 10. Examples of materials that may be used for the body portions 56, 58 include metals, metal alloys, ceramics and ceramic composites. In one example, the body portions 56, 58 may be high temperature nickel superalloys, including directionally solidified and single-crystal alloys In use, the conduit 52 can be used to provide a cooling fluid, such as air, to the vane 30. The cooling fluid is provided into the conduit 52 from either or both of the inner platform 34 and the outer platform 36, and travels along the radial height of the conduit 52, to the other platform 34, 36. Air passes from the conduit 52, into the cooling passage 70, through the openings 106 formed in the internal wall 78. The cooling fluid can then pass through the cooling passage 70 in either or both of an axial and radial direction (with respect to the axis of rotation R). The cooling fluid can escape the cooling passage 70 through the openings 124 provided near the leading edge 42 (only shown in FIG. 4D), and through the slot 76 at the trailing edge 44.

Figure 6:
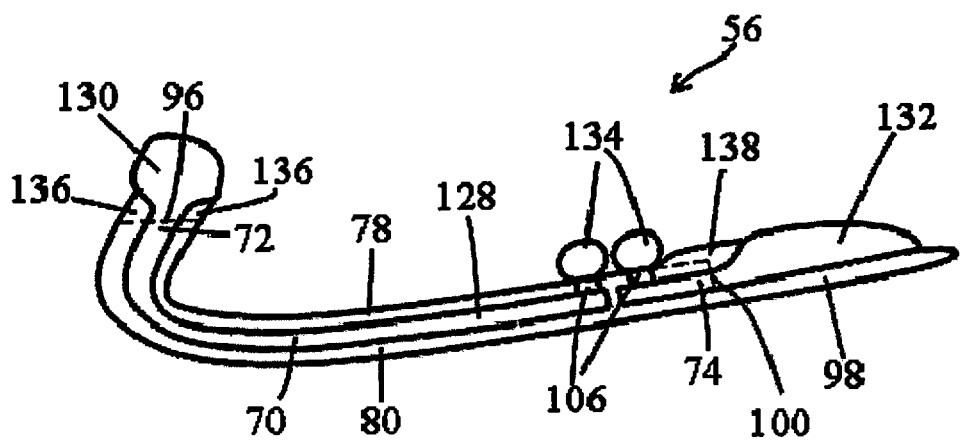
FIG. 6 illustrates the first body portion of the aerofoil of FIG. 3, during casting.
Figure 5:
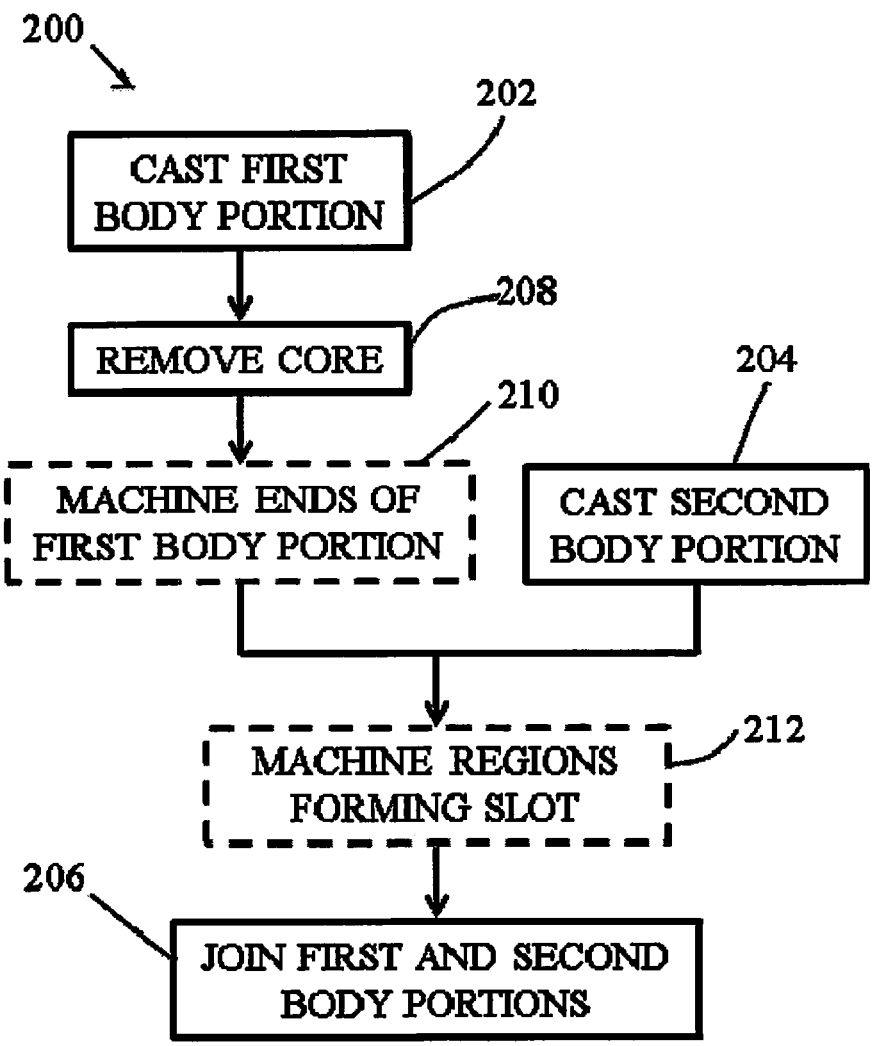
FIG. 5 schematically illustrates a method of manufacturing the aerofoil of FIG. 3.

A method 200 of manufacturing the vane 30 described in reference to FIGS. 3, and 4A to 4D will now be discussed, with reference to FIGS. 5 and 6.

In a first step 202, the first body portion 56 is formed by a casting process. In a second step 204, the second body portion 58 is formed by a separate casting process. In a third step 206, the body portions 56, 58 are joined together, for example by brazing.

A casting process uses a cavity defined in a mould to form an article. The cavity is the same shape as the article to be made. Liquid material is poured into the cavity, so that it adopts the shape. The material is then set. Internal structures within the article, are formed by cores. The cores are secured in the cavity, so the liquid material shapes around them. Once the material is set, the core can be removed, to leave the internal structure.

The second body portion 58 contains no internal structures, and so can be formed by a simple casting process using a mould. However, the first body portion 56 includes the passage 70. This passage 70 is formed by one or more cores 128. FIG. 6 illustrates an example of the first body portion 56, including a single core 128 for forming the passage 70. As seen in FIG. 6, the core 128 passes through the cooling passage 70, and out through the openings 96, 100 at both ends.

At the first opening 96 (at the leading edge 42 end of the body portion 56), an enlarged region 130 of the core 128 is formed outside of the passage 70. Similarly, at the second opening 100 (at the trailing edge 44 of the body portion 56) a second enlarged region 132 is formed outside the passage 70, along the extended region 98 of the external wall 80. The through-holes 106 in the internal wall are also formed by the core 128, and additional enlarged regions 134 are provided adjacent the interior face 62 of the first body portion 56, outside the through-holes 106. The enlarged regions 130, 132, 134 are enlarged such that the core is larger than the passage 70 or through-hole 106 through which it passes, outside the passage 70 or through-hole 106.

The enlarged regions 130, 132, 134 allow the core 128 to be supported during the casting process, for example from the mould. The enlarged portions 130, 132 at the opening 96, 100 enable the core to be supported from its ends, and the enlarged portions 134 at the through-holes 106 provide for further support. The support makes use of structures in the final part being cast, and so no specific support structures are required.

After the first body portion 56 is cast, the core 128 is removed in a step 208. The core can be removed by any suitable method. For example, the core 128 may be removed by acid or the like, used to dissolve the core 128. The acid should be inert with respect to the material of the body portion 56.

In the example shown, the part formed by casting is not the final shape for the vane 30. Therefore, the method 200 may include the step 210 of machining the first body portion 56 to remove unnecessary material 136, 138. In particular, the unnecessary material 136, 138 may be provided at the first end 92 of the external wall 80, and both ends 88, 90, of the internal wall. The dashed lines in FIG. 6 illustrate the extent of the material to be removed.

It will be appreciated that in some examples the cast part may be the correct shape, without machining. In other examples, different areas of material may need to be removed.

The method 200 may also include an optional step 212 of machining the regions 98, 116 of the body portions 56, 58 that form the sidewalls 84, 86 of the slot 76. This provides greater control over the size and consistency of the slot 76.

The through-holes 124 at the leading edge 42 may be formed as a further feature in the core 128 (also providing further support regions) or by machining after casting.

Similarly, the through-holes 106 in the internal wall 78 may be formed by machining, instead of using the core 124 as discussed above.

In the examples discussed above, the internal wall 78 and external wall 80 defining the passage 70 are wholly formed in the first body portion 56. As such, the bonding line 118 at the leading edge 42 is a single line across the end 72 of the passage 70. In other examples, a portion of either or both of the internal wall 78 and the external wall 80 may be formed in the second body portion 58.

In some embodiments, a portion of both walls 78, 80 may be formed in the second body portion 58. In this case, an internal core is still not required, as the part of the channel 70 formed at the end of the second body portion 58, and no internal structures are required.

In some embodiments, the ends of the parts internal wall 70 and external wall 80 in the first body portion 56 may be staggered, so that different length of the internal wall 70 and external wall 80 are formed in the second body portion 58. In some examples, one of the internal wall 78 and external wall 80 may be wholly formed in the first body portion 56, whilst the other wall 78, 80 is formed in both body portions 56, 58.

FIG. 7A shows one example where the ends of the walls 78, 80 in the first body portion 56 are staggered, although any suitable arrangement may be used. In this example, the external wall 80 terminates at the end 72 of the passage 70. However, the internal wall 78 formed by the first body portion 56 terminates short of the end 72 of the passage 70. The second body portion 58 includes a projection 140 forming the remainder of the internal wall 78.

In this example, the bond line 118 includes an offset, such that a first bond 118a is formed where the first end 88 of the external wall 80 meets the second body portion 58, and a second bond line 118b, where the projection 140 meets the internal wall 78 formed in the first body portion 56.

In yet further examples, the bond line 118 between the first body portion 56 and the second body portion 58 may only be formed at the end 88 of the internal wall 78. In these examples, the body 40 may include a spacing 142 between the body portions 56, 58 to form a one of the through-holes 124a between the passage 70 and the exterior of the vane 30. FIGS. 7B and 7C illustrate examples of this.

In FIG. 7B, the arrangement of the first body portion 56 and the second body portion 58 is as in FIG. 7A. The second body portion 58 includes a projection 140 forming part of the internal wall 88 to provide a joint 118b. A spacing 142 is provided between the external wall 80 and the end 108 of the single wall 82 adjacent the end 72 of the passage. This spacing 142 forms a through-hole 124a from the passage to the exterior of the vane 30, at an end 72 of the passage 70.

Alternatively, FIG. 7C shows an example in which the internal wall 78 terminates adjacent the end 72 of the passage 70, and the second body portion 58 includes a projection 140 forming a part of the external wall 80. A spacing 142 is formed where the projection 140 meets the first body portion 56, to form a through-hole between the passage 70 and the exterior of the vane 30, spaced form the end 72 of the passage 70.

Where a passage 124a is formed at the join between the external wall 80 and the second body portion 58, the opening 144 of the passage on the exterior surface 50 is widened, and the passage then gradually tapers to a final width part way along its length.

In the examples discussed above, the vane 30 is split on the rear face 46, near the leading edge 42. It will be appreciated that this is by way of example only. The body of the vane 30 may be divided in any way that allows an opening 72 in the passage 70 to be closed by bringing together the two body portions 56, 58 and which allows the core for the passage 70 to be supported through the ends 72, 74 of the passage 70, during casting. For example, each body portion 56, 58 may have at least part of one of the faces 46, 48 of the body 40.

Furthermore, the body portions 56, 58 may be bonded together at any contact points between the parts. Also, brazing is just one example of a bonding technique that can be used to join the parts. Any other suitable technique may be used.

Similarly, any suitable technique may be used to join the vane 30 to the platforms 34, 36, instead of bi-cast joints. For example, the vane 30 may be fixed to the platforms 34 using welding or brazing.

The structure of the vane 30 discussed above is given by way of example only. It will be appreciated that the vane 30 may have any suitable shape, depending on the desired use of the vane 30.

Furthermore, the shape and structure of the conduit 52 is given by way of example only, and any suitable conduit 52 may be used. For example, the conduit 52 may not extend the full radial height of the vane 30, or the full length from the leading edge 42 to the trailing edge 44, of the full width from the front face 48 to the rear face 46. The struts 112 discussed above are given by way of example only, and any number or arrangement of struts 112 may be used. In some examples, the struts 112 may be omitted.

In the above examples, the cooling passage 70 may not extend the full radial height of the vane 30, or the full length from the leading edge 42 to the trailing edge 44. Furthermore, in the above examples, the width of the cooling passage 70 is constant along is axial length and radial height. However, the width of the passage 70 may be varied in one or both of these directions by proper sizing of the core 128 used in casting. For example, the passage 70 may be wider at any apertures 76, 106, 124 where the cooling fluid enters or exits the passage 70, and narrower between these regions, in order to increase cooling efficiency.

Similarly, in the above examples the width of the slot 76 is constant along the radial height of the vane 30, but this may also be varied.

In some examples, there may be two or more cooling passages 70 formed in the body 40. The cooling passages may be provided at different heights along the aerofoil 30, or on different faces 46, 48. Each passage 70 may be formed by a core 128, supported through openings at the ends of the passage 70. Further support may, optionally, be provided through openings into the passage formed along the length of the passage 70.

In the examples discussed above, the slot 76 at the trailing edge 44 is formed by bringing the body portions 56, 58 together. In other examples, the slot 76 may be formed in one of the body portions 56, 58. This may be by using a core in the casting process, or by machining after casting. Where the slot 76 is formed in this way, a further contact point may be provided between the body portions 56, 58, near the trailing edge 44. This can be used for brazing or bonding the body portions 56, 58 together.

The slot 76 may extend the full radial height of the body 40, or a portion of the radial height. The slot 76 may include spacers or supports (not shown) extending between the sidewalls 84, 86, positioned along its radial height, forming partial closures, so that there are a series of slots separated by partial closures. The partial closures may also provide further brazing points. Alternatively, the slot 76 may be fully open along its radial height. Shaped passages may be used instead of slots.

Similarly, the through-holes 106 in the internal wall 78 and the through-holes in the external wall 80 at the leading edge 44 may extend the full radial height of the body 40, or a portion of the radial height. For example, these through-holes may be narrow channels, rather than extended openings.

The path of cooling fluid discussed above is given by way of example only, and the cooling may follow any suitable path. The conduit 52 and passage 70 may be arranged to cause the passage of the cooling fluid along a particular desired path. For example, the struts 112 may be used to help direct the cooling fluid along particular paths.

The stator 32 described above is given by way of example. Any suitable stator 32 may be used. In some embodiments, the stator 32 may only include a single annular platform 34, 36.

The method 200 discussed above is also given by way of example only. Any suitable method for manufacturing the vane 30 may be used. For example, the body portions 56, 58 may be formed of processes other than casting.

The above embodiments are related to a vane 30 for use in a stator 32 in a turbine engine 10. However, it will be appreciated that this is just one example of an aerofoil, and the teaching of the disclosure may be applied to any aerofoil, in a turbine engine or not.

It will be understood that the disclosure is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

I claim:

1. A method of manufacturing an aerofoil having a pair of opposing axial faces extending between a leading edge and a trailing edge, the method including:
   casting a first body portion forming at least part of the first axial face of the aerofoil, the first body portion having a passage passing there-through,
   wherein the passage extends from an opening at a first end at or near the leading edge to an opening at a second end at or near the trailing edge;
   wherein the passage is formed during the casting process by a core; and,
   wherein the core is supported at the first and second end through the respective openings of the passage, during casting,
   removing the core from the first body portion;
   casting a second body portion forming at least part of the second axial face; and,
   joining the first body portion and the second body portion to form the aerofoil, wherein the second body portion closes at least the opening at the first end of the passage.

2. The method as claimed in claim 1, wherein:
   the second body portion does not fully close the opening at the second end of the passage; and
   the first and second body portions co-operate at the second end of the passage to form a slot extending from the passage to the exterior of the aerofoil,
   wherein the slot is defined by a first sidewall formed by the first body portion and a second sidewall, opposing the first sidewall, formed by the second body portion.

3. The method as claimed in claim 2, including:
  machining a region of either or both of the first body portion and a region of the second body portion forming the sidewalls of slot.

4. The method as claimed in claim 1, wherein:
  the passage is formed between an external wall arranged to form an external surface of the aerofoil, and an internal wall opposing the external wall, and arranged to face an interior of the completed aerofoil.

5. The method as claimed in claim 4, wherein joining the first body portion and the second body portion to form the aerofoil includes:
  bonding an end of the internal wall formed by the first body portion to the second body portion,
  wherein an end of the external wall formed by the first body portion is spaced from the second body portion, such that a through-hole extending from the passage to the exterior of the aerofoil is formed at or near the leading edge.

6. The method as claimed in claim 4, wherein at least one of the internal wall and external wall is formed wholly in the first body portion.

7. The method as claimed in claim 4, wherein:
  the first body portion includes through-holes extending through the internal wall, into the passage; and,
  the core is further supported at the through-holes, during casting.

8. The method as claimed in claim 1, wherein in the first body portion, the external wall extends beyond the internal wall at the trailing edge.

9. The method as claimed in claim 8, wherein the core extends out of the opening at the second end, along the external wall, and wherein the core is enlarged in a region outside the opening at the second end, such that the enlarged region of the core is larger than the passage.

10. The method as claimed in claim 1, including:
  removing a portion of the material of the first body portion in the region of either or both of the first end and the second end of the passage.

11. The method as claimed in claim 1, wherein:
  a conduit is formed between the first body portion and the second body portion; and,
  the conduit is separated from the passage by a part of the first body portion.

12. An aerofoil having:
  a pair of opposing axial faces extending between a leading edge and a trailing edge, and a length extending parallel to the leading edge and trailing edge;
  a conduit formed extending along the length of the aerofoil; and
  a passage extending adjacent to a first of the pair of axial faces, from a first end at the leading edge to a second end at the trailing edge,
  wherein the aerofoil comprises a first body portion, and a second body portion formed separately from and bonded to the first body portion;
  wherein the conduit is formed between the first body portion and the second body portion; and,
  wherein the passage extends within the first body portion, and at least a first end of the passage is closed by the second body portion.

13. The aerofoil as claimed in claim 12, including:
  a slot formed at the trailing edge, the slot extending from the second end of the passage, to an exterior of the aerofoil,
  wherein the slot is defined by a first sidewall formed by the first body portion and a second sidewall, opposing the first sidewall, formed by the second body portion, such that the slot is formed by the first body portion and the second body portion in co-operation.

14. The aerofoil as claimed in claim 12, wherein the first body portion comprises an external wall arranged to form an external surface of the aerofoil, and an internal wall opposing the external wall, and arranged to face an interior of the completed aerofoil; and wherein the passage is defined between the internal wall and the external wall.

15. The aerofoil as claimed in claim 14, wherein the external wall of the first body portion extends beyond the internal wall at the second end of the passage.

16. The aerofoil as claimed in claim 14, including:
  a bonded joint between the internal wall of the first body portion, and the second body portion; and,
  a through-hole extending from the passage to the exterior of the aerofoil, a first side of the through-hole formed by the external wall of the first body portion, and a second side of the through-hole, opposing the first side, formed by the second body portion.

\* \* \* \* \*